Aug. 4, 1931.  G. JAKOPEC ET AL  1,817,824
MAGIC CARDS AND PLANETARY CALCULATOR
Filed Dec. 31, 1929   3 Sheets-Sheet 2
Fig. 5.
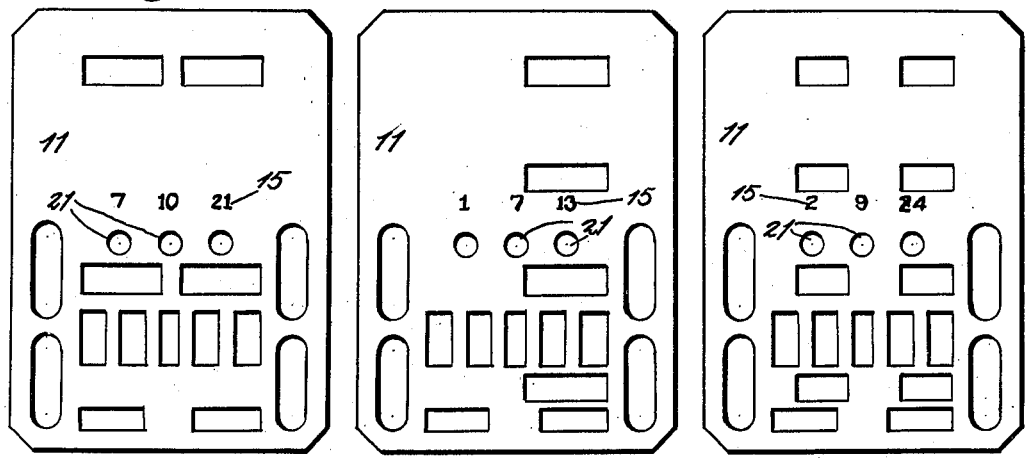
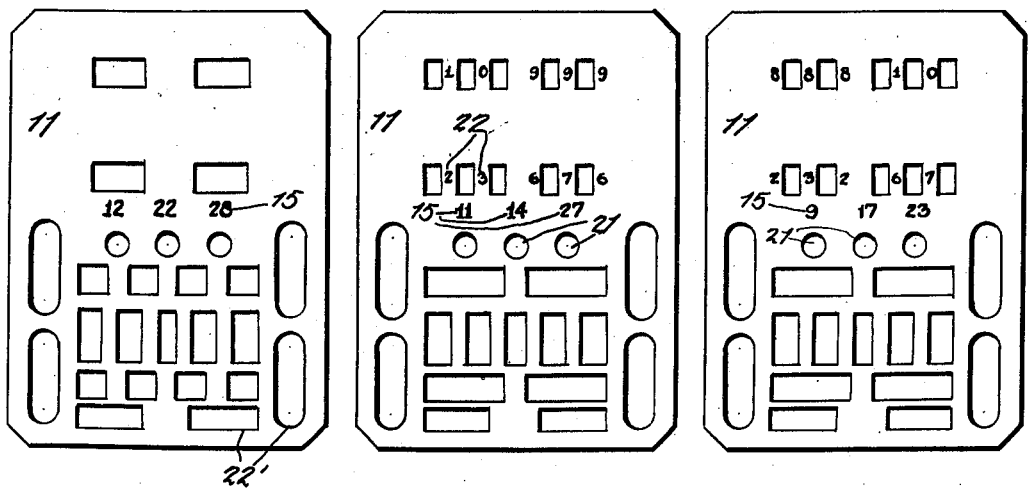
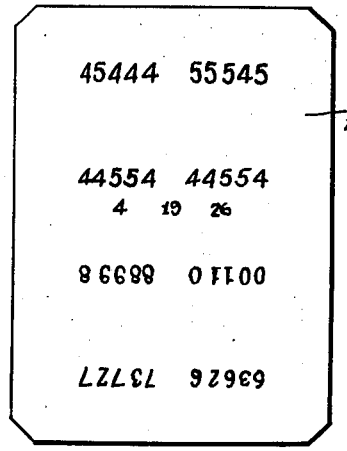
Inventors
George Jakopec &
Josip Samu.
By Bryant & Lowry
Attorneys Aug. 4, 1931.  G. JAKOPEC ET AL  1,817,824
MAGIC CARDS AND PLANETARY CALCULATOR
Filed Dec. 31, 1929  3 Sheets-Sheet 3

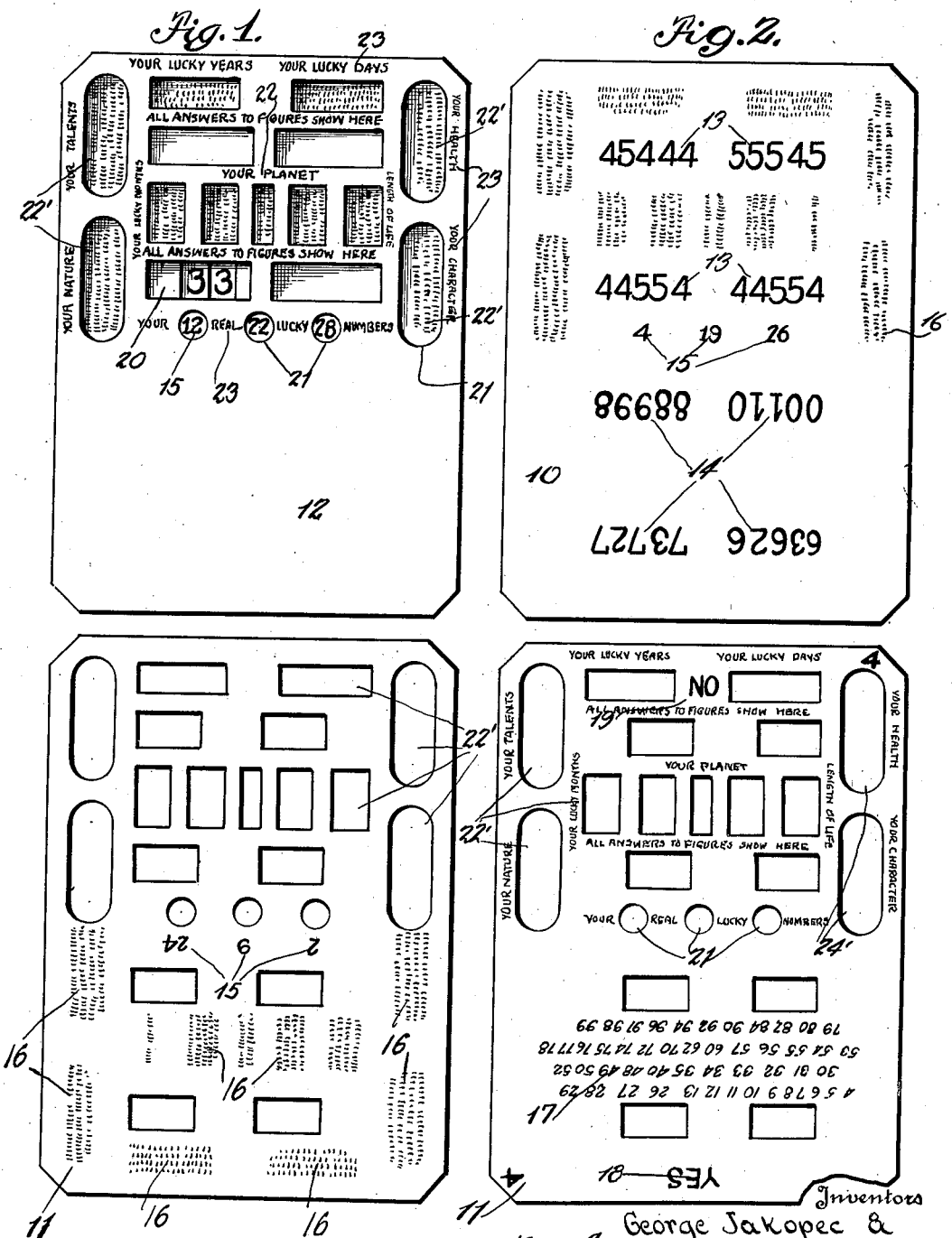

Inventors
George Jakopec &
Josip Samu.
By Bryant & Lowry
Attorneys

Patented Aug. 4, 1931

1,817,824

UNITED STATES PATENT OFFICE

GEORGE JAKOPEC AND JOSIP SAMU, OF CHICAGO, ILLINOIS

MAGIC CARDS AND PLANETARY CALCULATOR

Application filed December 31, 1929. Serial No. 417,742.

This invention relates to an improvement in amusement devices or games and has special reference to a fortune telling device or game.

The object of the invention is to provide a novel and amusing game consisting of a set of cards whereby ages, birth dates, numbers thought of and the like may be discovered and whereby the telling of fortunes by astrological data may be performed.

With the above and other objects in view, the invention consists in general of cards or sheets bearing data of various sorts and having openings arranged to expose selective data upon proper arrangement, as hereinafter specifically described and claimed and as illustrated in the accompanying drawings.

In the accompanying drawings, like characters of reference indicate like parts in the several views, and:—

Figure 1 is a plan view of the sheets shown in their superimposed position and showing the reading or cover sheet on top of the pile;

Figure 2 is a face view of the base sheet;

Figure 3 is a face view of one of the sheets;

Figure 4 is a rear view of the sheet shown in Figure 3;

Figure 5 is a face view of the entire set of sheets except the reading sheet;

Figure 6:
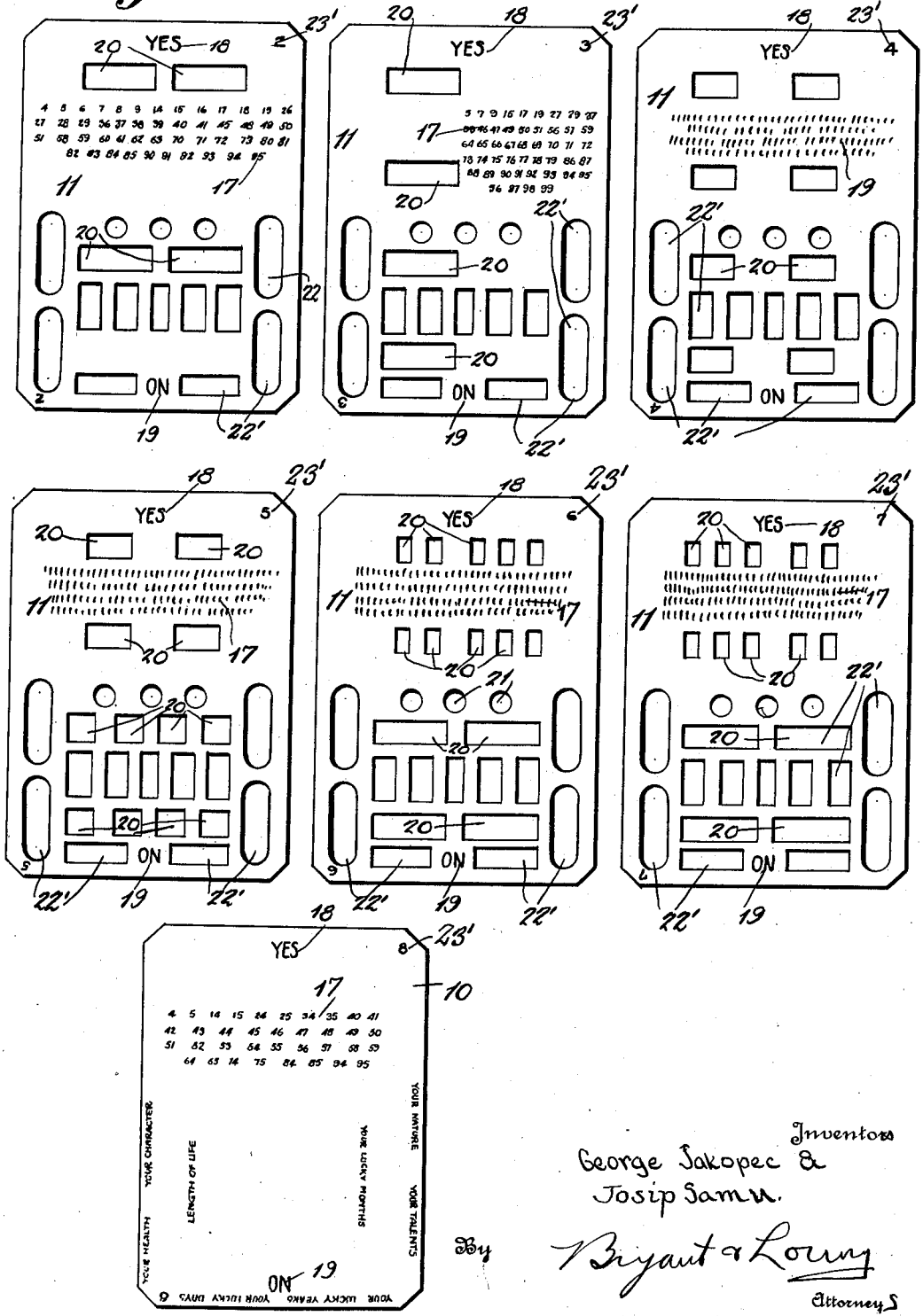
Figure 6 is a rear view of the sheets shown in Figure 5.

In the embodiment of the invention here illustrated, there is provided a set of cards or sheets, all of the same size and eight in number, this being one more than the number of planets according to astrological usage. These sheets are known respectively as a base sheet 10, eliminating sheets 11 and a reading or cover sheet 12.

The base sheet 10 is provided on its face or obverse side with blocks of numbers 13 in which the numbers are closely spaced at one end and with the blocks of numbers 14 in which the numbers are widely spaced at the opposite end. Also, just above the center on this side are printed certain numbers 15 which, in this device, are termed "lucky" numbers for the purposes of the device and will be so termed in this specification and claims to distinguish them from other numbers. Furthermore, this base card has at its upper end blocks of printed matter 16 which are of such nature as to refer to special matters in a person's life as their nature, talents, lucky years and days, health, character, length of life, ruling planet and the like. On the reverse, as shown in Figure 6, this sheet bears a group of numbers 17 between 1 and 99 which are used as indicia for the positioning of this sheet, each of the sheets 11 likewise bearing a group of index numbers 17 for the same purpose. It will be noted that the groups on the different sheets contain different numbers, no two sheets containing the same index numbers. The word "Yes" is printed at 18 on the top of the reverse side of each of sheets 10 and 11 and the word "No" is printed at 19 on the normal bottom thereof, each of the sheets 11 is provided with numerals 23' on the upper corner in close relation to the legend "Yes". The cards are adapted to be arranged in numerical order to produce the desired results.

Openings 20, positioned to expose the numbers 13 and 14 selectively and arranged for exposing all or part of a block of numbers are formed at each end of each sheet 11. These openings differ in length and in some cases certain of these openings are omitted as shown on the sheets numbered 2 and 3 in Figure 6.

Openings 21 are normally positioned in sheets 11 and 12 just below the figures so that inversion of a sheet 11 will expose the numbers 15 just below on an erect sheet.

Numbers 22 are positioned on the obverse of certain of the sheets 11 adjacent certain of the openings 21 to cooperate with the numbers 13 and 14 and be exposed through certain of the openings 20 of sheets superimposed on a sheet bearing said numbers 21.

Openings 22' are formed at one end of each of sheets 11 and 12 corresponding in position and area to the blocks of printing 16 and symmetrically arranged in the opposite or lower ends of sheets 11 to said printing 16.

Indicia 23 is printed on the sheet 12 to indicate to what the printed matter exposed through the openings in said card relates and this card 12 is provided with full sized number openings 20 at one end only, the other or lower end of the card being imperforate.

As an example of one method of using the device, the operator keeps the card 12 and hands the card 11 numbered 2 at 23 to the person whose fortune is to be told and directs him to note the numbers on the back of the card and to state if the year of his birth is among the index numbers. The operator takes the card back and if the answer has been affirmative places it, obverse side up on top of the sheet 12 which is held with its obverse or blank side up, keeping the word "Yes" at the top or perforated side of sheet 12. If the answer is negative, the sheet 11 is placed obverse side up on the sheet 12 but with the word "No" at the top of the sheet 12; in other words, the sheet 11 is turned upsidedown. The operator follows the same procedure until all of sheets 11 and sheet 10 have been positioned in the order of the numbers 23' in a pile on top of the reading sheet. He now reverses the pile whereupon it will be found that the birth year will be shown through one opening 20 as in Figure 1, certain numbers 15 will be exposed through openings 21 and printed matter 16 will be exposed through openings 22' which is to be read as the person's fortune.

Obviously, other numbers, as a person's age, his birth month or day and the like may be used as a basis of the fortune told.

There has thus been provided a simple and amusing device of the kind described and for the purpose specified.

Having thus described the invention, what is claimed is:—

1. In a device of the kind described, a plurality of sheets adapted to be superimposed and including a base sheet having blocks of numbers arranged in rows at each end with the numbers at one end inverted with respect to the numbers at the other end, eliminating sheets having openings arranged to expose selected numbers in said blocks, certain of the eliminating sheets having numbers beside certain of said number exposing openings, a reading sheet having openings therein at one end corresponding in size and position to the blocks of numbers at each end of the base sheet and calculated planetary inscriptions on the reading sheet whereby fortunes may be told to persons according to their age.

2. In a device of the kind described, a plurality of sheets adapted to be superimposed including a base sheet having a plurality of blocks of printed matter at one end, a plurality of eliminating sheets each having at one end a plurality of openings of such size and position as to expose the blocks of printed matter on the base sheet when superimposed thereon in erect position, said eliminating sheets also each having at the opposite end a plurality of blocks of calculated planetary printed matter arranged symmetrically with respect to said openings whereby said printed matter will be exposed through the openings of superimposed sheets upon inversion of an eliminating sheet, said sheets also including a reading sheet having one end imperforate and the other end provided with openings corresponding to said openings in the eliminating sheets.

In testimony whereof we affix our signatures.

GEORGE JAKOPEC.
JOSIP SAMU.